United States Patent [19]

Schleifer et al.

[11] Patent Number: 5,239,855
[45] Date of Patent: Aug. 31, 1993

[54] POSITIONAL CALIBRATION OF ROBOTIC ARM JOINTS RELATIVE TO THE GRAVITY VECTOR

[75] Inventors: Arthur Schleifer, Palo Alto, Calif.; Philip B. Fuhrman, Wilmington, Del.; Mark E. Shuman, West Chester, Pa.

[73] Assignee: Hewlett-Packard Company, Palo Alto, Calif.

[21] Appl. No.: 729,748

[22] Filed: Jul. 12, 1991

[51] Int. Cl.$^5$ .............................................. G05B 19/42
[52] U.S. Cl. ...................................................... 73/1 D
[58] Field of Search ......................... 73/1 D, 1 R, 1 E; 364/571.01; 901/3-5, 15; 395/89

[56] References Cited

U.S. PATENT DOCUMENTS

| | | | |
|---|---|---|---|
| 4,221,997 | 9/1980 | Flemming | 318/574 |
| 4,474,047 | 10/1984 | Carlson | 73/1 E |
| 4,481,592 | 11/1984 | Jacobs et al. | 364/513 |
| 4,505,049 | 3/1985 | Kuno et al. | 33/333 |
| 4,632,012 | 12/1986 | Feige et al. | 89/41.09 |
| 4,792,228 | 12/1988 | Haffner | 356/138 |
| 4,804,897 | 2/1989 | Gordon et al. | 318/568 |
| 4,827,624 | 5/1989 | Franklin et al. | 33/366 |
| 4,831,549 | 5/1989 | Red et al. | 395/89 |
| 4,841,762 | 6/1989 | Hunter | 73/1 R |
| 4,843,566 | 6/1989 | Gordon et al. | 364/513 |
| 4,943,158 | 7/1990 | Pertl et al. | 356/4 |

FOREIGN PATENT DOCUMENTS

| | | |
|---|---|---|
| 63-008904 | 1/1988 | Japan . |
| 63-008905 | 1/1988 | Japan . |
| 63-121908 | 5/1988 | Japan . |
| 63-127306 | 5/1988 | Japan . |

*Primary Examiner*—Robert Raevis
*Attorney, Agent, or Firm*—Richard F. Schuette

[57] ABSTRACT

Methods of calibrating robotic manipulators are disclosed. The present invention uses an inclinometer or a leveling device to provide a reference to calibrate each encoder for each joint of a robotic manipulator. The inclinometer or leveling device is most preferably an electronic protractor or similar device that is placed on a surface of one of the links and the joint is moved until the link is at a preselected angle. In certain embodiments an offset position between the level position and an index position for an absolute encoder is determined and absolute encoder data describing the offset position is recorded. Preferably, the inclinometer is capable of generating a signal that indicates the angle of the surface of the link with respect to the gravity vector. This signal can be used to control the joints and automatically calibrate the manipulator.

8 Claims, 1 Drawing Sheet

POSITIONAL CALIBRATION OF ROBOTIC ARM JOINTS RELATIVE TO THE GRAVITY VECTOR

The present invention is directed to methods and apparatus for calibrating a robotic manipulator that has one or more encoders connected to one or more of its joints.

BACKGROUND OF THE INVENTION

As the sciences of robotics and robotic system programming continue to advance, problems that had previously been of little consequence rise in importance. Robotic systems have generally become more commonplace and the most advanced systems are highly flexible, permitting a variety of tasks to be undertaken. However, each task undertaken by most robotic systems embodies one or more programmed motions that move a portion of the system from a first point in space to another point. In order to effectively program the robotic system, some point in space must usually be defined as an origin, with all other points within the reach envelope of the system being defined relative to that origin.

For example, an articulated member such as an anthrophromorphic robot arm employing incremental encoders for servo positioning and feedback needs some form of absolute position as an origin. Using an absolute encoder to determine the position of each joint of the robot only solves part of the problem since some form of calibration from a reference on each joint is also required. Ideally, the robotic system would provide an objective reference point so that the end user of the system could calibrate and recalibrate the robotic system to the same point as that set by the manufacturer of the robotic system.

Prior art approaches to this problem have included returning the joint encoders or detectors to an initial value or position when the robotic system is initialized. This is usually accomplished using a mechanical fixture that defines an origin and is affixed to the robotic system. However, such systems only provide a single reference point for calibration This presents a situation where the coordination of the joints while the manipulator is being moved is difficult or impossible since there is no knowledge of the absolute position of the joints prior to or after their being positioned at the origin point defined by the fixture In other words, although encoders could determine the position of a fixture relative to an initial position, the coordinates of the initial position are unknown since the manipulator has not been calibrated. Moreover, providing precisely machined fixtures is relatively expensive and somewhat cumbersome for use in the field, e.g., on a factory floor or lab bench. Finally, the inherent compliance that exists in each joint results in a different overall manipulator compliance at different positions. This fact, coupled with the varying deflections caused by differing loads, makes it unlikely that the calibration is repeatable or that it will be accurate over a range of motion. Typically, prior art systems introduce another source of potential error since they do not calibrate the origin using a maximum payload.

In certain prior art systems, the fixture described above is an integral part of the structure of the manipulator, permitting it to be calibrated with respect to itself. However, in addition to many of the disadvantages noted above, such systems suffer from the further drawback of requiring relatively high machining tolerances on the external components of the manipulator assembly. Also, as above, calibration in these systems is somewhat subjective to the user. More importantly, calibration is not directly referenced to the work area. This calibration scheme is therefore dependent upon the manipulator mounting and the work area remaining fixed and stable in a known orientation.

For example, U.S. Pat. No. 4,481,592 — Jacobs et al. discloses a calibration system for a robotic arm that uses a fixture attached to the base of the manipulator. The end point of the fixture establishes a known position of orientation for the end effector and using this information and the fixed length between joints, an offset may be stored for future correction. A calibration fixture that is an integral part of the internal drive mechanism is disclosed in U.S. Pat. No. 4,474,047 — Carlson.

It is possible to eliminate the calibration sequence described above and merely locate the arm in a first position, designate that position the origin and teach the robotic manipulator the required path, e.g., using a teach pendant. Although this form of calibration is possible and even somewhat practical for use in robotics research, it creates a severe disadvantage in any type of production environment. If no origin is programmed, the unique set of tolerances and assembly variances of each manipulator makes sharing the programming of positions impossible. Therefore, it is desirable to program an origin into a robotic manipulator. The programming of an origin point should be relatively simple if absolute encoders are provided at each axis of motion and calibrated for each manipulator. However, as pointed out above, such calibration is both more expensive and time consuming than calibration using fixtures which, at present, provides the only practical solution to the problem.

Other types of calibration procedures have been disclosed U.S. Pat. No. 4,841,762 — Hunter discloses a method for calibrating a robot by selecting specific points within its envelope of motion and moving the end effector to these selected points. By moving the robotic arm using different configurations, the origin for an axis can be determined mathematically. U.S. Pat. No. 4,792,228 — Haffner discloses a laser-based position sensing and feedback system for an X-Y-Z coordinate system robot. By using three laser beams the invention disclosed permits translational, angular and rotational deviations of the robotic system to be determined.

However, there remains a need for a procedure for establishing an origin and calibrating a manipulator that is simple and repeatable. Such a system should permit calibration to be undertaken in the same manner both during fabrication of the manipulator and in the field. Accordingly, it is an object of the present invention to provide procedures for calibrating robotic manipulators that do not rely on external fixtures or prior knowledge of the orientation of the manipulator. It is a further object of the present invention to permit a manipulator to be calibrated with respect to a working surface of any orientation. Additionally, it is an object of certain embodiments of the present invention to carry out the calibration procedure in an automated fashion.

SUMMARY OF THE INVENTION

The present invention uses an electronic protractor, an inclinometer or a leveling device to provide a reference to calibrate each encoder for each joint of a robotic manipulator relative to the direction of the gravity vector. In certain embodiments, the level can be an electronic device which provides a leveling signal, as opposed to a mechanical or physical device, such as a bubble level.

The present invention provides methods for calibrating robotic manipulators to define an origin point. The manipulators calibrated using the present invention comprise at least a first link connected by a rotatable joint to a base, wherein the displacement of the rotatable joint is measured by an encoder. The methods of the present invention preferably comprise the steps of placing an inclinometer or leveling device on one of the links at a preselected location having a known angle with respect to the link centerline or some other reference position and moving the rotatable joint until the link is level or at a reference angle position. In certain embodiments, an offset position between this position and an indexed position of an absolute encoder can optionally be determined and encoder data describing the offset position recorded. However, in certain embodiments of the present invention, an absolute encoder is not used and thus the index positions are not determined. In certain embodiments of the present invention the manipulator will be comprised of a plurality of links and rotatable joints each of the joints having an encoder. In such embodiments, the methods of the present invention will further comprise the steps described above with reference to calibrating a single link, but will be repeated for each link associated with each joint of the robotic manipulator beginning with the joint closest the base and working forward toward the end effector. In certain embodiments, the methods of the present invention are carried out automatically through the use of an electronic protractor or other devices that generate a signal indicating orientation relative to the direction of the gravity vector. Finally, in certain embodiments of the present invention it will be preferable to repeat the calibration steps in order to verify that no inadvertent movement of any of the joints has occurred during the calibration procedure.

DETAILED DESCRIPTION OF THE PREFERRED EMBODIMENTS

The present invention permits a robotic manipulator to be calibrated by using an electronic protractor, inclinometer or a leveling device to determine an initial calibration position relative to the gravity vector. For purposes of the present invention, the term "inclinometer" is meant to encompass electronic protractors and other devices that measure the angle of a surface relative to the gravity vector, as well as leveling devices, including electronic and mechanical levels, that indicate when a surface is perpendicular to the direction of the gravity vector. An inclinometer is placed or otherwise connected to a portion of the structure of the robotic manipulator that can be conveniently moved to a selected angle to provide a reference point for each axis of motion. It should be noted that the positions for each reference point do not necessarily have to be associated with a zero angle or known reference angle for that particular joint. The present invention uses the gravity vector and its relationship to the work surface or base frame of the manipulator as its reference for calibration. The orientation of the work area, therefore, does not have to be "level" since the electronic protractor used in preferred embodiments of the present invention can measure and store the orientation of the work surface. However, the angle of the surface where the leveling device is located must be known with respect to zero or a known reference angle and is preferably accomplished by providing a surface that has been precisely machined and measured during fabrication. Once the inclinometer is positioned at zero (or a preselected angle) for a section of the robotic manipulator, the exact angle for the robot joint can be determined, since the precise angle of the surface to which the level is attached is known. The exact angle may then used as a reference or index position for an absolute encoder and the calibration procedure. The present invention therefore permits the end user of the robotic manipulator to perform the calibration procedure as required both during fabrication and in the field.

Figure 1:
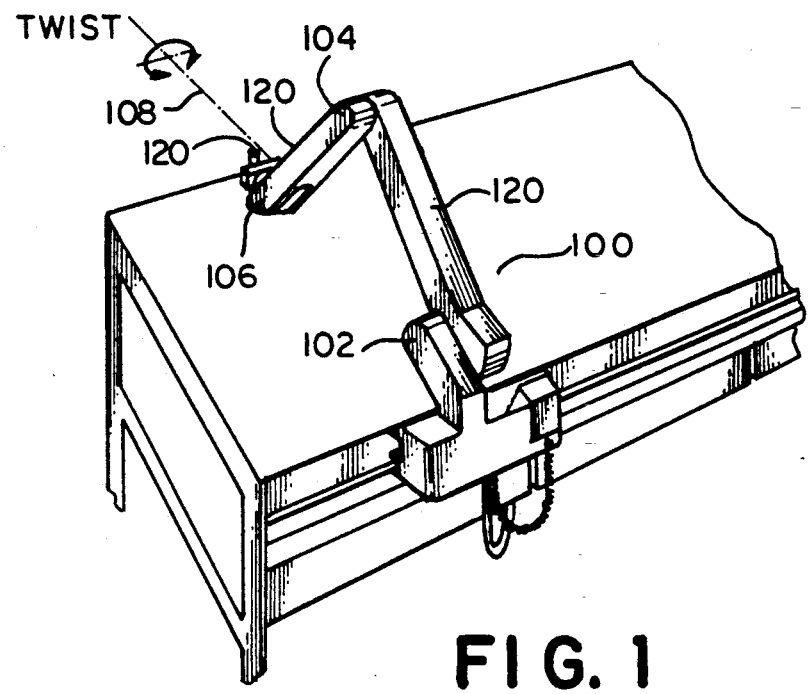
FIG. 1 is a perspective view of a robotic manipulator of the type that incorporates the apparatus of the present invention.

Referring to FIG. 1, there is shown a perspective view of a robotic manipulator 100 that has a shoulder joint 102, an elbow joint 104, and a wrist joint 106 and twist axis 108 associated with the end effector. A typical robotic system in which the present invention is useful is illustrated in U.S. Pat. No. 4,843,566 — Gordon et al. which is assigned to the assignee of the present invention and incorporated herein by reference. Also visible in FIG. 1 are the locations 120 where an inclinometer or leveling device is preferably placed. In order to perform a calibration procedure in accordance with the present invention, an inclinometer or leveling device is placed on the locations 120 illustrated for the upper arm, forearm, hand and end effector to provide reference positions for the shoulder 102, elbow 104, wrist 106 and twist 108 joint axes respectively. As will be understood by those of ordinary skill, the locations 120 illustrated are exemplary and related to the design of the robotic manipulator 100 illustrated. The structural design, degrees of freedom, motion envelope and task to which the manipulator is applied are a few of the factors that must be taken into account when choosing the locations 120 of the inclinometer or leveling device. It will be further understood that although multiple locations 120 are illustrated as positions at which the inclinometer or leveling device can be attached to the robotic manipulators, the calibration techniques of the present invention can be carried out using a single, detachable device that is moved to different locations 120 during the course of the calibration procedure. This latter method will represent the preferred embodiment of the present invention when the payload of the manipulator and cost are concerns. In other instances, it will be desirable and feasible to permanently mount separate devices to each location 120 on the robotic manipulator where one is required.

As noted above, for purposes of the present invention, an inclinometer or leveling device is any device that provides an indication that a structure is at a particular angle with reference to the gravity vector. Preferably, a device such as an electronic protractor or other form of inclinometer is used that is capable of measuring a precise angle relative to the gravity vector. However, even a conventional "bubble level" or sight glass that indicates that the surface is perpendicular to the gravity vector can be used. Electronic devices for measuring angles relative to the gravity vector and their application to structures is well known. See, e.g., U.S. Pat. Nos. 4,827,624 — Franklin et al. and 4,943,158 — Pertl et al. These electronic inclinometers are accurate and can provide a signal indicative of an angle that may be used in certain embodiments of the present invention in conjunction with the control system of the robotic manipulator to automatically determine when a portion of the structure is at a selected angle.

Figure 2:
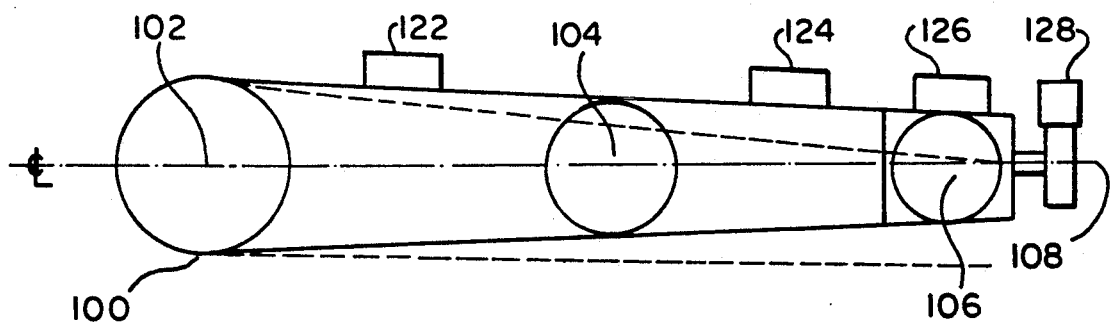
FIG. 2 is a side elevation, partially schematic view of a robotic manipulator arm incorporating the apparatus of the present invention.

A side elevation view of a portion of the robotic manipulator 100 illustrated in FIG. 1 is shown in FIG. 2. The manipulator 100 is illustrated in a "level" position; the phantom view shows the manipulator 100 in a position where all the joint angles are zero. The difference between the view illustrated in FIG. 2 and that seen in phantom is due to the shape of the structure, thus "level" does not necessarily represent zero joint angles for purposes of the present invention.

The robotic manipulator 100 illustrated has an encoder located at each of the four rotatable joints 102, 104, 106, 108. As explained above, these encoders must be calibrated with respect to a known position of the joint. Since the angle introduced by the structure of the robotic manipulator can be precisely determined with respect to the centerline between the joints, placing an inclinometer or leveling device at predetermined locations on the structure and moving the joints individually until the device(s) indicate that a preselected angle has been reached defines an absolute angle of the joint. Those of ordinary skill will appreciate that the repeatability and accuracy of this calibration procedure makes it ideally suited for applications where the robotic system is frequently relocated with respect to other equipment.

In order to calibrate the manipulator 100 illustrated in FIG. 2, the user must first move the manipulator until the arm is approximately straight and parallel to the work surface. The calibration procedure begins at the joint closest to the base of the manipulator and proceeds to the next joint forward of this point until the distal joint or end effector is reached since the calibration of each joint relies on the calibration of the preceding joint. Thus, a shoulder inclinometer or leveling device 122 is placed on the upper arm of the manipulator and the shoulder joint 102 is rotated until the shoulder inclinometer or leveling device 122 indicates that a preselected angle has been reached. If the shoulder inclinometer or leveling device 122 is permanently affixed to the manipulator, it and the other affixed devices are merely activated in the sequence set forth below. If the inclinometer or leveling device is detachable, it is removed from the shoulder and next placed on the forearm to create a forearm inclinometer or leveling device 124. The elbow joint 104 of the manipulator is then moved until the forearm inclinometer or leveling device 124 indicates that a preselected angle has been reached. Next, the inclinometer or leveling device 120 is placed on the hand of the manipulator to create a hand inclinometer or leveling device 126. The wrist joint 106 is then moved until the hand inclinometer or leveling device 126 indicates that a preselected angle has been reached. Finally, the inclinometer or leveling device is placed on the end effector in a position relative to the twist joint 108 such that a twist joint inclinometer or leveling device 128 is created. When the twist joint inclinometer or leveling device 128 indicates that a preselected angle has been reached, the manipulator 100 has been set to a preselected position, for example, perpendicular with respect to the gravity vector, and can now be calibrated. However, in some instances inadvertent movement of one or more of the joints may have occurred during the calibration procedure. For this reason, it will usually be desirable to repeat the above-described steps to ensure that the manipulator maintained the selected orientation. If some movement has occurred, the manipulator must be recalibrated.

For the manipulator 100 illustrated, the calibration procedure is finalized for the shoulder, elbow, and wrist joints by invoking the initialization of the absolute encoders described above in the firmware that controls the servos. The initialization procedure for absolute encoders is well known in the art and will vary depending upon the specific encoder and the system in which it is installed. In the case of the embodiment illustrated, the servo moves the joint from the selected angle of the calibration position to an indexed position of an absolute encoder, and the encoder precisely measures the distance traveled. However, as noted above, the use of absolute encoders is not necessary to practice the present invention. The encoders measure the joint displacement from the selected angle of the calibration position to the indexed position and a joint offset is calculated and stored. In certain rotational joints that undergo a large degree of rotation, e.g., up to 360°, a shutter blade or other single position absolute encoder is used to define a relative reference position for the encoder. The selected angle of the position therefore provides a single absolute reference for such an axis. The initialization procedure involves rotating the joint until the shutter blade is engaged; the offset from this reference position is then stored. An offset position is therefore the difference between the selected angle of the calibration position and an indexed position.

Thus, when a robotic manipulator is activated after initial calibration, the shoulder, elbow, and wrist joints are moved until the absolute encoders encounter an indexed position The stored calibration offsets are then used to calculate an absolute position in encoder counts, which is then converted into angles. Joints such as the twist joint are rotated until the shutter blade is encountered and then moved back to the zero position using the stored calibration twist offset. This places the manipulator joints in a known position.

In certain embodiments of the present invention, operator intervention is unnecessary in the above-described calibration procedure. As explained above, in certain embodiments, the electronic protractors or inclinometers are permanently affixed to the robotic manipulator. These devices are chosen to be the type that transmit an electronic signal indicating an angle, and the servos are programmed to sense this signal and complete the calibration procedure in the manner described above.

The present invention thus provides a calibration system for a robotic manipulator that is low cost and uses readily available hardware and software functions. The calibration procedure disclosed is objective to the user and is repeatable. The identical calibration procedure is used both during the initial manufacturing calibration and in the field, permitting easier and more reliable recalibration after the manipulator is repaired or removed and replaced.

Although certain embodiments of the present invention have been described in detail above, the present invention is not limited thereby. Upon review of the specification and drawings, those of ordinary skill will immediately realize further modifications, adaptations and applications of the disclosed invention. Accordingly, reference should be made to the appended claims in order to determine the scope of the present invention.

What is claimed is:

1. A method of calibrating a robotic manipulator having a distal end to define an origin point of the distal end at an arbitrary point in space, the manipulator comprising at least a first link connected to a base by a rotatable joint, the displacement of the rotatable joint being measured by an encoder, the method comprising the steps of:

placing an inclinometer for measuring the angle of a surface relative to the gravity vector on the link at a preselected location having a known angle with respect to the link centerline and an absolute joint position;

determining a preselected angle with respect to the gravity vector by using the known angle;

moving the rotatable joint until distal end is at the origin point, wherein the link is at the preselected angle with respect to the gravity vector; and recording encoder data to store the joint positions at the preselected angle, whereby the location of the origin point is defined.

2. The method of claim 1, wherein the robotic manipulator is comprised of a plurality of links and rotatable joints, each having an encoder, wherein a second link is connected to the first link, the method further comprising the steps of:

placing an inclinometer on the second link;

determining a preselected angle with respect to the gravity vector;

moving the joint associated with the second link until it is at the preselected angle; and recording encoder data to store the joint positions at the preselected angle, whereby these steps are repeated for each of the plurality of links and associated joints, and whereby the robotic manipulator is calibrated with respect to an offset position.

3. The method of claim 2, wherein a separate inclinometer is affixed to each of the plurality of links and the steps of moving the rotatable joints and recording encoder data are carried out automatically in a sequence beginning at a first joint attached to the first link, and proceeding for each of the joints to the distal end of the manipulator.

4. The method of claim 2, wherein each step of the calibration method is carried out a second time to verify the accuracy of the calibration.

5. The method of claim 2 wherein the inclinometer is a leveling device and the steps of moving the joints associated with the links comprises moving the joint until the link is level.

6. The method of claim 1 wherein the step of moving the rotatable joint is carried out automatically.

7. The method of claim 1 wherein the inclinometer is a leveling device and the step of moving a rotatable joint comprises moving the joint until the link is level.

8. The method of claim 1 wherein at least one joint has an absolute encoder and the method further comprises the steps of:

determining an offset position between the joint position at the preselected angle and an indexed position; and recording encoder data describing the offset position.

* * * * *